United States Patent
Ishida et al.

(10) Patent No.: US 7,113,391 B2
(45) Date of Patent: Sep. 26, 2006

(54) SOLID ELECTROLYTIC CAPACITOR AND METHOD FOR MANUFACTURING THE SAME

(75) Inventors: Hideki Ishida, Takasago (JP); Eizo Fujii, Hirakata (JP); Takeshi Takamatsu, Daito (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/171,356

(22) Filed: Jul. 1, 2005

(65) Prior Publication Data

US 2006/0012946 A1    Jan. 19, 2006

(30) Foreign Application Priority Data

Jul. 14, 2004  (JP) .............................. 2004-206787
Jul. 20, 2004  (JP) .............................. 2004-210970

(51) Int. Cl.
  *H01G 4/228* (2006.01)
  *H01G 9/00* (2006.01)
  *H01G 2/10* (2006.01)

(52) U.S. Cl. ..................... 361/540; 361/535; 361/533

(58) Field of Classification Search ................ 361/531, 361/533, 535–540, 523, 528–529; 29/25.03
See application file for complete search history.

(56) References Cited

U.S. PATENT DOCUMENTS 6,816,358 B1 *  11/2004  Kida et al. ................. 361/540
6,870,727 B1 *  3/2005   Edson et al. ............... 361/523
6,903,921 B1 *  6/2005   Ishijima .................... 361/523
2003/0151884 A1 * 8/2003 Matsumoto ................ 361/523
2005/0286210 A1 * 12/2005 Ishida et al. ............... 361/516

FOREIGN PATENT DOCUMENTS

| JP | 3312246 | 1/2001 |
| JP | 2001-68841 | 3/2001 |
| JP | 2001-358041 | 12/2001 |
| WO | WO 2004/090920 A1 | 10/2004 |

* cited by examiner

*Primary Examiner*—Eric W. Thomas
(74) *Attorney, Agent, or Firm*—Armstrong, Kratz, Quintos, Hanson & Brooks, LLP (57) ABSTRACT

An anode terminal or a cathode terminal is provided with an exposure portion that extends substantially perpendicularly to an arrangement direction of the two terminals and that have an end face exposed on a side face of a housing. At least the end face on the exposure portion is plated for improving the solder wettability. Furthermore, a front end portion of the exposure portion is bent upwards along a peripheral face of the housing.

8 Claims, 6 Drawing Sheets

SOLID ELECTROLYTIC CAPACITOR AND METHOD FOR MANUFACTURING THE SAME

BACKGROUND OF THE INVENTION

1. Field of the Invention

The present invention relates to a solid electrolytic capacitor and a method for manufacturing the same.

2. Description of the Related Art

Figure 12:
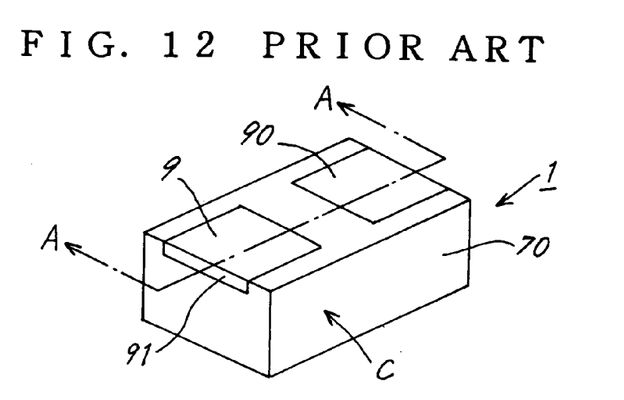
FIG. 12 is a perspective view of a conventional solid electrolytic capacitor.
Figure 13:
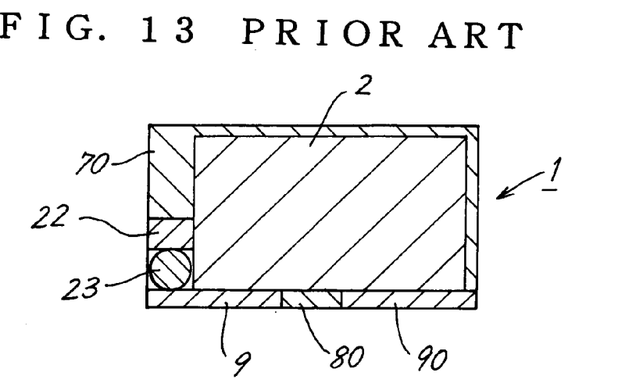
FIG. 13 is a cross-sectional view of the solid electrolytic capacitor in FIG. 12 taken along line A—A.

FIG. 12 is a perspective view showing a conventional solid electrolytic capacitor (1) upside down. FIG. 13 is a cross-sectional view taken along line A—A in FIG. 12, and shows the capacitor in FIG. 12 upside down (see Japanese Patent No. 3312246).

The solid electrolytic capacitor (1) is provided with a capacitor element (2) from which an anode lead (22) projects, and the capacitor element (2) is covered by a housing (70) made of a synthetic resin. The bottom face of the capacitor element (2) is attached to a cathode terminal (90), and the anode lead (22) is attached to an anode terminal (9) via a bolster member (23). Between the anode terminal (9) and the capacitor element (2), an insulating material (not shown) is provided.

Figure 14:
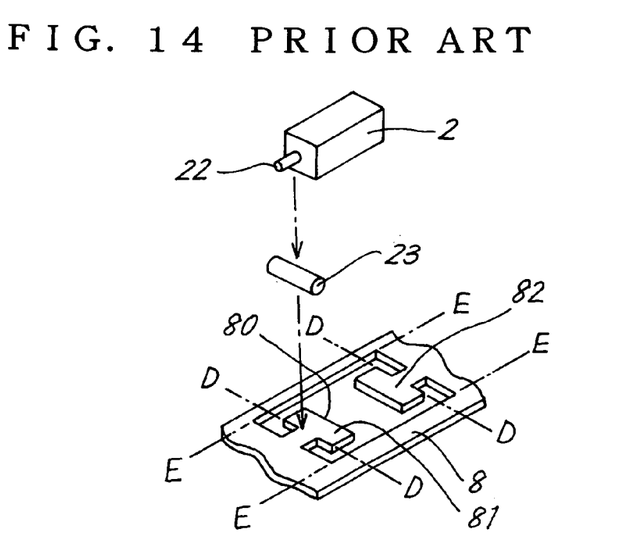
FIG. 14 is a perspective view showing a process of manufacturing the conventional solid electrolytic capacitor.

The solid electrolytic capacitor (1) is formed in the following manner. First, as shown in FIG. 14, a metal plate (8) is punched such that a first and a second terminal component (81) and (82), which become the anode terminal (9) and the cathode terminal (90), are provided. The two terminal components (81) and (82) are provided having an opening (80) therebetween, and their end edges are opposed to each other. The anode lead (22) is attached to the first terminal component (81), which becomes the anode terminal (9), via the bolster member (23), and the peripheral face of the capacitor element (2) is attached to the second terminal component (82), which becomes the cathode terminal (90). The peripheral face of the capacitor element (2) is covered by the housing (70), the metal plate (8) is cut along lines D—D and E—E, and thus the solid electrolytic capacitor (1) is obtained.

However, conventional solid electrolytic capacitors have the following problems.

1. In the solid electrolytic capacitor (1) shown in FIG. 12, the end faces of the anode terminal (9) and the cathode terminal (90) are not exposed on the side face along the arrangement direction of the terminals (the face C shown in FIG. 12) of the housing (70). Accordingly, in a state where the solid electrolytic capacitor (1) has been soldered to a printed board (not shown), it is impossible to confirm whether or not the anode terminal (9) or the cathode terminal (90) has been precisely soldered when viewed from the side.

2. Furthermore, in the solid electrolytic capacitor (1) shown in FIG. 12, an end face (91) is exposed on the housing (70). However, the end face (91) is a so-called cut face obtained by cutting the first terminal component (81), and thus the solder wettability thereof is poor. Accordingly, in a state where the solid electrolytic capacitor (1) has been soldered to the printed board, it is difficult to confirm whether or not they are soldered when viewing the end face (91).

3. It is necessary to improve the work efficiency when forming the anode terminal (9) and the cathode terminal (90) from the metal plate (8).

SUMMARY OF THE INVENTION

It is an object of the present invention to provide a solid electrolytic capacitor in which it is possible to easily confirm whether or not the terminals have been precisely soldered in a state where the solid electrolytic capacitor has been soldered to a printed board. Also, it is another object of the present invention to improve the work efficiency when forming the anode terminal (9) and the cathode terminal (90) from the metal plate (8).

In the solid electrolytic capacitor of the present invention, the anode terminal (9) or the cathode terminal (90) is provided with an exposure portion (5) or (50) having an end face (52) or (51) that is exposed on the side face of the housing (70). The anode terminal (9) or the cathode terminal (90) extends substantially perpendicularly to an arrangement direction of the two terminals (9) and (90). At least the end face (52) or (51) on the exposure portion (5) portion is plated for improving the solder wettability.

Furthermore, the front end portion of the exposure portion (5) or (50) is bent upwards along the peripheral face of the housing (70) to form portion (53).

The first exposure portion (5) is connected to the second exposure portion (50) that extends along the arrangement direction of the two terminals (9) and (90), and the second exposure portion (50) has a narrower width than the first exposure portion (5), and at least one of the second exposure portions (50) has the end face (51) exposed on the end face of the housing (70).

EFFECT OF THE INVENTION

1. The end face (52) or (51) of the exposure portion (5) is exposed on the side face of the housing (70), and thus the solder is attached to the end face (51, 52) in a state where the terminals (9) and (90) have been soldered. Thus, it is possible to easily confirm whether or not the terminal (9) or (90) has been precisely soldered. In particular, when the end face (52) or (51) is plated for improving the solder wettability, the confirmation is easy.

2. Furthermore, the front end portion of the exposure portion (5) is bent upward along the peripheral face of the housing (70) to form the portion (53). In the bent portion (53), the back surface of the terminal (9) or (90) faces outward. The back surfaces of the terminal (9) and (90) are soldered without fail, and thus in a state where the terminals (9) and (90) have been soldered, the solder is easily attached to the outer side of the bent portion (53). Accordingly, it is possible to easily confirm whether or not the terminal (9) or (90) has been precisely soldered.

3. The first exposure portion (5) and the second exposure portion (50) are connected to each other, and thus when solder is applied to the intersecting point between the first exposure portion (5) and the second exposure portion (50), the solder flows toward the first exposure portion (5) and the second exposure portion (50). Thus, also in this respect, it is easy to confirm a state in which the terminal (9) or (90) has been soldered.

4. The second exposure portion (50) has a narrower width than the first exposure portion (5). As described later, when a metal plate is punched to form the two terminals (9) and (90), the second exposure portion (50) is cut. By letting the second exposure portion (50) have a narrow width, the work efficiency when forming the two terminals (9) and (90) is improved.

DESCRIPTION OF THE PREFERRED EMBODIMENTS

Hereinafter, an example of the present invention will be described with reference to the drawings.

Figure 1:
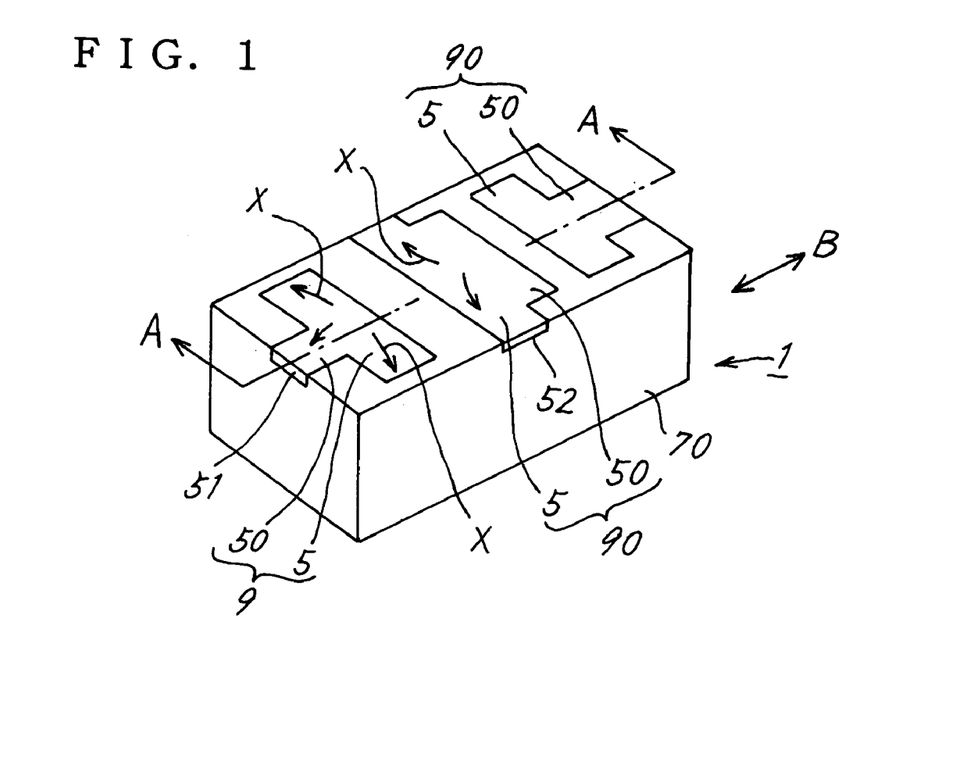
FIG. 1 is a perspective view showing a solid electrolytic capacitor upside down.
Figure 2:
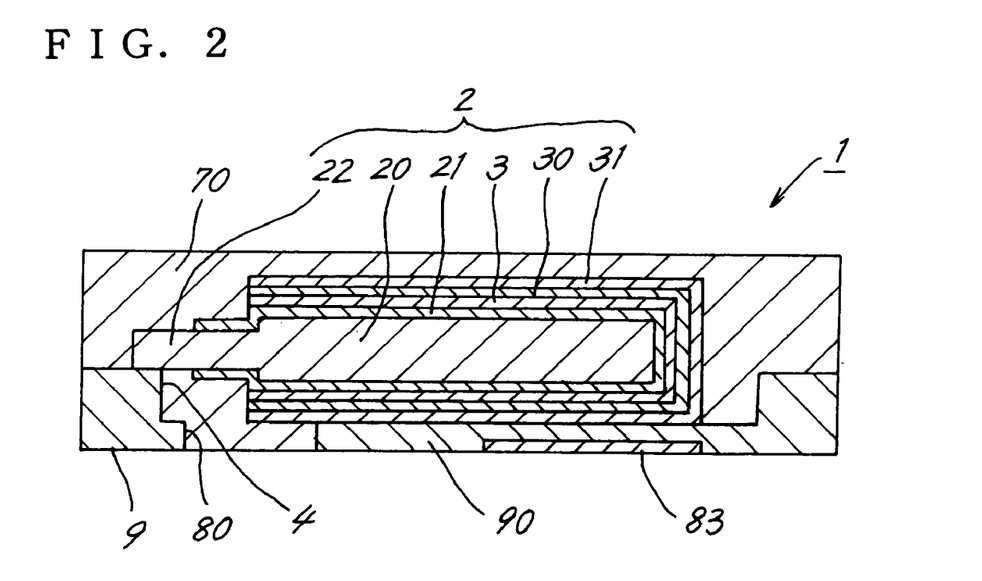
FIG. 2 is a cross-sectional view of the solid electrolytic capacitor in FIG. 1 taken along line A—A.

FIG. 1 is a perspective view showing a solid electrolytic capacitor (1) upside down. FIG. 2 is a cross-sectional view taken along line A—A in FIG. 1, and shows the capacitor in FIG. 1 upside down.

A capacitor element (2) is covered by a housing (70) made of a synthetic resin, and the bottom faces of the two terminals (9) and (90) are exposed on the housing (70). A recess face (4) is formed on the two terminals (9) and (90), and the peripheral face of the capacitor element (2) is mounted on this recess face (4). The two terminals (9) and (90) are opposed to each other having therebetween an opening (80) that is filled up with the synthetic resin configuring the housing (70). The shorter this gap is, the smaller the loop inductance is, and then an ESL (equivalent series inductance) can be reduced.

Furthermore, the end edges opposed to each other of the opening (80) are positioned on the inner sides of the peripheral edges of the recess face (4), and the opening (80) is connected to the recess face (4). Since the opening (80) is connected to the recess face (4), the flowability of the molten synthetic resin is improved when molding the housing (70).

The capacitor element (2) is made by forming a dielectric oxide coating (21) on a part of an anode body (20) from which an anode lead (22) projects, with a cathode layer (3), a carbon layer (30), and a silver paste layer (31) formed in this order on the dielectric oxide coating (21). The anode lead (22) and the anode body (20) are made of a valve metal, which forms an extremely compact dielectric oxide coating having durability when treated by electrolytic oxidation. Examples of this valve metal include Al (aluminum), Ta (tantalum), Ti (titanium), and Nb (niobium).

The anode lead (22) is attached to the anode terminal (9) by resistance-welding, and the peripheral face of the capacitor element (2) is attached to the recess face (4) with a conductive adhesive.

Method for Manufacturing a Capacitor Element

Hereinafter, a method for manufacturing the capacitor element (2) will be described, but this method is the same as the conventional one. First, a part of the anode body (20) made of tantalum is immersed in a phosphoric acid solution and treated by electrolytic oxidation, and the dielectric oxide coating (21) is formed on the peripheral face. Next, known chemical polymerization and electrolytic polymerization are used to form the cathode layer (3) made of a conductive high polymer that is polypyrrole. The carbon layer (30) and the silver paste layer (31) are formed in this order on this cathode layer (3).

In this example, as a material for the anode body (20), sintered tantalum has been used. However, there is no particular limitation as long as a valve-action metal is used, the one in the form of foil or plate may be used.

Besides the polypyrrole mentioned above, examples of materials for forming the cathode layer (3) include polythiophene, polyaniline, polyfuran, and other conductive high polymers, and TCNQ (7, 7, 8, 8-tetracyanoquinodimethane) complex salt. Since conductive high polymers or so forth having a low resistance are used for the cathode layer (3), the ESR is reduced and a capacitor that is excellent in the high frequency property is formed.

As shown in FIG. 1, in the two terminals (9) and (90), a part is exposed and the other parts are covered by the resin configuring the housing. The two terminals (9) and (90) have a first exposure portion (5) that extends substantially perpendicularly to the arrangement direction (the arrow B in FIG. 1) of the two terminals (9) and (90), and a second exposure portion (50) that extends along the arrangement direction of the two terminals (9) and (90). The second exposure portion 50 is positioned at the central portion in the width direction of the first exposure portion (5), the two exposure portions (5) and (50) are connected to each other, and the second exposure (50) has a narrower width than the first exposure portion (5).

On the cathode terminal (90), the number of the pair of exposure portions (5) and (50) is plural, more specifically, two. In other words, the solid electrolytic capacitor (1) is soldered to the printed board at three pairs of exposure portions (5) and (50). Accordingly, the binding strength between the solid electrolytic capacitor (1) and the printed board is improved.

One of the components on the cathode terminal (90), more specifically, the first exposure portion (5) on the inner side has end faces (52) exposed on the side faces of the housing (70), and the second exposure portion (50) of the anode terminal (9) has an end face (51) exposed on the end face of the housing (70).

The two exposure portions (5) and (50), including the end faces (51) and (52), may be plated for improving the solder wettability. The plating is performed by forming layers of palladium and gold in this order, but other materials also may be used as long as they improve the solder wettability.

Furthermore, in order to improve the binding strength between the solid electrolytic capacitor (1) and the printed board, a method is conceivable in which the entire surface of the cathode terminal (90), which has a larger surface area than the anode terminal (9), is exposed. However, since the cathode terminal (90) is larger than the anode terminal (9), the amount of solder that is in contact therewith is also large.

Accordingly, in a state where the entire bottom face of the cathode terminal (90) is exposed, when the two terminals (9) and (90) are soldered to the printed board, the solder that is in contact with the cathode terminal (90) shrinks to pull the solid electrolytic capacitor (1), resulting in poor attachment of the solid electrolytic capacitor (1). Thus, the cathode terminal (90) has a configuration in which a part of it is covered by a resin, and it is soldered on two portions.

As described above, the end faces (51) and (52) of the first and the second exposure portions (5) and (50) are exposed on the end face and side face, respectively, of the housing (70). Accordingly, in a state where the solid electrolytic capacitor (1) has been soldered to the printed board, it is possible to confirm a state in which the terminal (90) has been soldered when viewing the end faces (52) of the first exposure portion (5) of the terminal (90) from the side. In particular, on the cathode terminal (90), the first exposure portion (5) having the end faces (52) exposed on the side faces of the housing (70) is apart from the other first exposure portion (5), and thus they are effectively used to confirm the soldering state.

Furthermore, since the portions on the two terminals (9) and (90) covered by a resin have poor solder wettability, solder shifts toward the exposure portions (5) and (50) of the terminals (9) and (90). The solder applied to the intersecting points between the first exposure portions (5) and the second exposure portions (50) in FIG. 1 flows outwards to the end faces (51) and (52) along the first and the second exposure portions (5) and (50) as shown by the arrow X. Thus, also in this respect, it is easy to confirm a state in which the two terminals (9) and (90) have been soldered.

Also, the end face (52) of the first exposure portion (5) of the anode terminal (9) may be exposed on the side faces of the housing (70).

Procedure of Forming a Solid Electrolytic Capacitor

Figure 3:
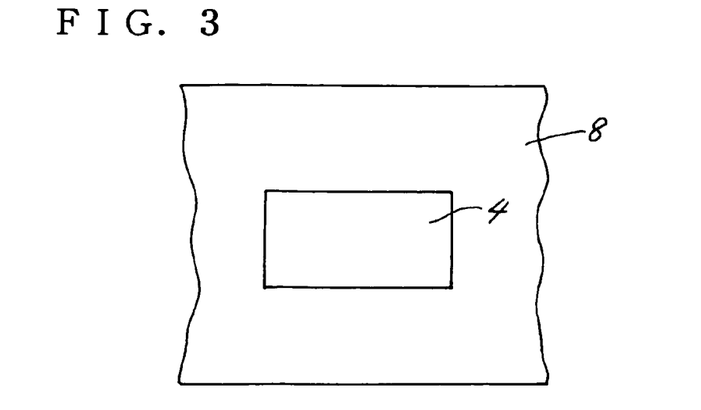
FIGS. 3 and 4 are plan views of a metal plate, which becomes terminals.
Figure 4:
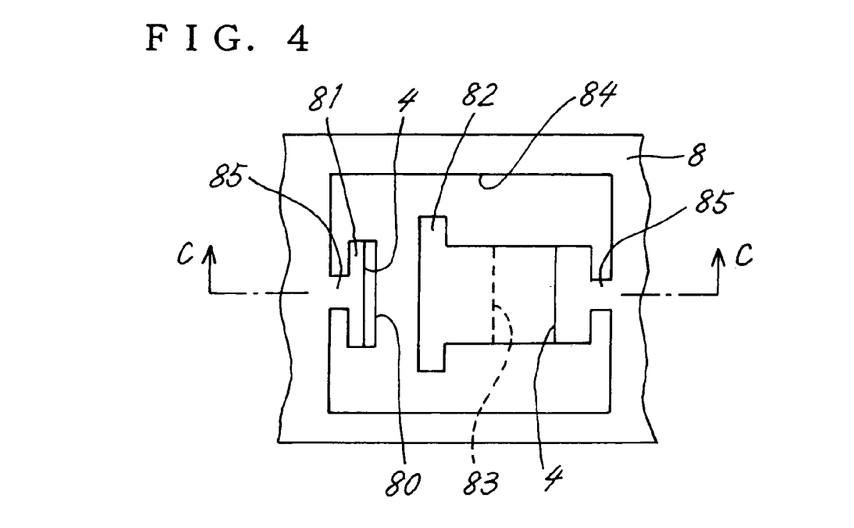

Hereinafter, the procedure of forming the solid electrolytic capacitor (1) will be described. FIGS. 3 and 4 are plan views of a metal plate (8), which becomes a base material for the terminals (9) and (90), and the main components of this metal plate (8) are iron or copper and nickel. First, the metal plate (8) is etched or half-blanked to form the recess face (4). Next, as shown in FIG. 4, the metal plate (8) is punched to form a large hole (84), and inside this large hole (84), the first terminal component (81), which becomes the anode terminal (9), and the second component (82), which becomes the cathode terminal (90) are formed having the opening (80) therebetween. The recess face (4) straddles the two terminal components (81) and (82).

Herein, as described above, the end edges opposed to each other of the opening (80) are positioned on the inner sides of the peripheral edges of the recess face (4). When forming the opening (80), since it is difficult to match the end edges of the opening (80) with the end edges of the recess face (4), the end edges of the opening (80) are displaced from the peripheral edges of the recess face (4). The two terminal components (81) and (82) are connected to the peripheral edge portions of the large hole (84) via connectors (85), which become the second exposure portions (50).

On the bottom face of the second terminal component (82), a recess portion (83) that is to be filled up with the resin configuring the housing (70) is provided. The portions on the second terminal component (82) other than the recess portion (83) become the first exposure portions (5) and the second exposure portions (50).

Figure 5:
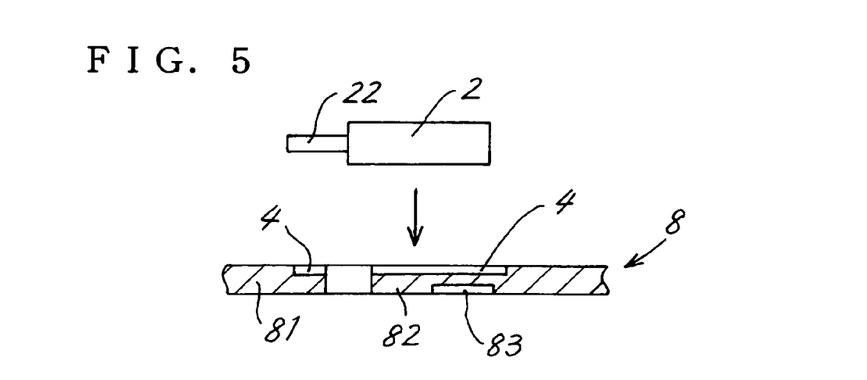
FIG. 5 is a cross-sectional view of the metal plate in FIG. 4 taken along line C—C.
Figure 6:
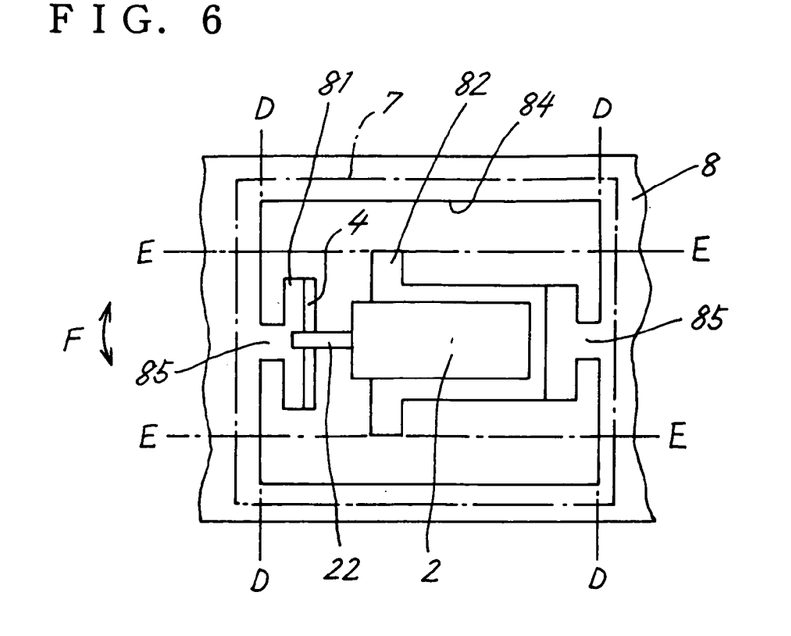
FIG. 6 is a plan view showing a process of manufacturing the solid electrolytic capacitor.

Next, as shown in FIGS. 5 and 6, the peripheral face of the capacitor element (2) is mounted on the recess face (4), straddling the two components (81) and (82), and is attached thereto with a conductive adhesive.

The anode lead (22) is mounted on a portion of the first terminal component (81) other than the recess face (4), and is resistance-welded thereto. Subsequently, as shown in FIG. 6, the two terminal components (81) and (82) are covered by a resin block (7) configuring the housing (70). More specifically, the metal plate (8) is covered by a mold (not shown) from the top and the bottom, and the resin block (7) is formed by injection molding of the resin. Then, the resin block (7) and the metal plate (8) are cut using a dicing saw or similar device along lines D—D and E—E, and thus the solid electrolytic capacitor (1) shown in FIG. 1 is obtained.

The connectors (85), which become the second exposure portions (50), have a narrower width than the first exposure portions (5). Thus, cutting using a dicing saw or similar device is easy, and the work efficiency when forming the two terminals (9) and (90) is improved.

In this state, the two terminals (9) and (90) are electroless-plated to form thin layers of palladium and gold in this order. The end faces (51) and (52) of the first and the second exposure portions (5) and (50) are also plated. It should be noted that if it is possible to plate only the end faces (51) and (52) of the first and the second exposure portions (5) and (50), the amount of palladium and gold for plating can be reduced.

The end faces (52) of the first exposure portion (5) are plated for improving the solder wettability. Accordingly, in a state where the terminal (90) has been soldered, the solder is attached to the end faces (52), and thus it is possible to easily confirm whether or not the terminal (90) has been precisely soldered when viewed from the side. Also, it is possible to confirm a state in which the terminals (9) and (90) have been soldered when viewing the side faces (51) of the second exposure portions (50).

Second Embodiment

Figure 7:
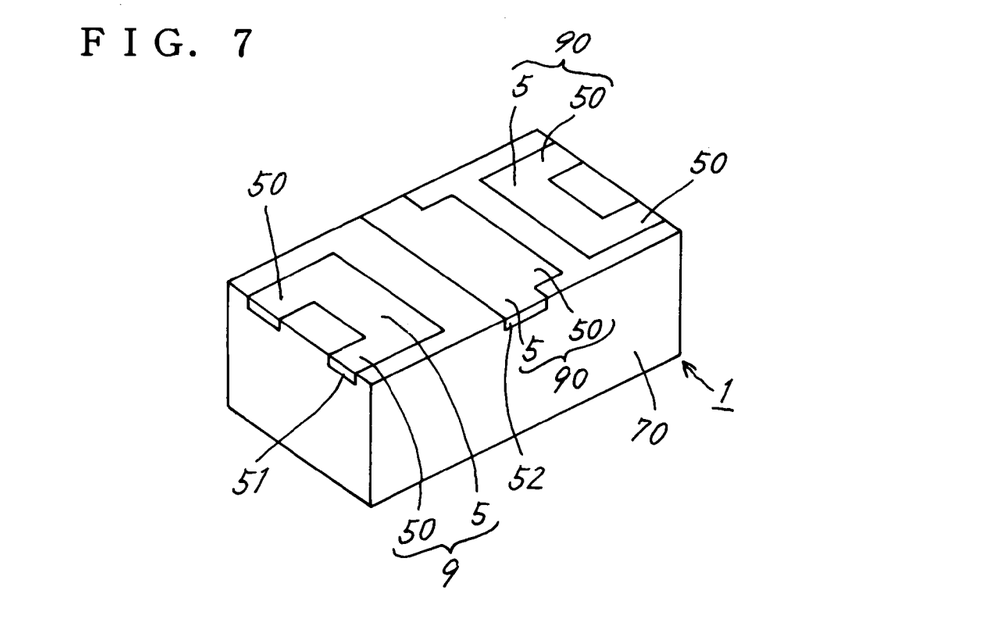
FIG. 7 is a perspective view of another solid electrolytic capacitor.

In another example, as shown in FIG. 7, two of the second exposure portions (50) and (50) may be provided on both sides of the first exposure portions (5).

Figure 8:
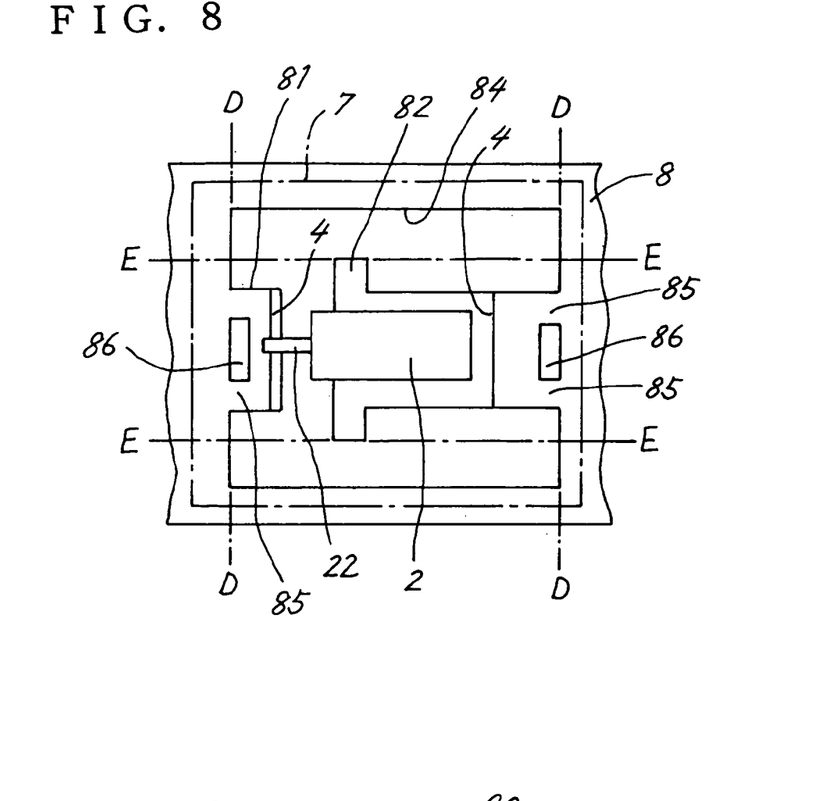
FIG. 8 is a plan view showing a process of manufacturing the solid electrolytic capacitor in FIG. 7.

In order to form the solid electrolytic capacitor (1) shown in FIG. 7, as shown in FIG. 8, small rectangular holes (86) are provided on base end portions of the two terminal components (81) and (82). The portions on both sides of the small holes (86) on the two terminal components (81) and (82) serve as the connectors (85) and (85), which become the second exposure portions (50) and (50). The capacitor element (2) is mounted inside the recess face (4), and the capacitor element (2) is covered by the resin block (7). The resin block (7) and the metal plate (8) are cut using a dicing saw or similar device along lines D—D and E—E, and thus the solid electrolytic capacitor (1) shown in FIG. 7 is obtained.

In this example, since the two connectors (85) and (85), which become the second exposure portions (50) and (50), are provided, the advantage is obtained that the terminal component (81) and the capacitor element (2) are displaced less from each other in resistance-welding.

In other words, when the anode lead (22) is resistance-welded to the first component (81), the anode lead (22) and the first component (81) are pressed from the top and the bottom. In this case, when only one connector (85) is used as shown in FIG. 6, the first terminal component (81) moves in the direction F within the plane including the metal plate (8). As a result, there is the possibility that the relative position between the first terminal component (81) and the capacitor element (2) is displaced. In particular, when the connector (85) is narrow, movement happens easily.

Figure 10:
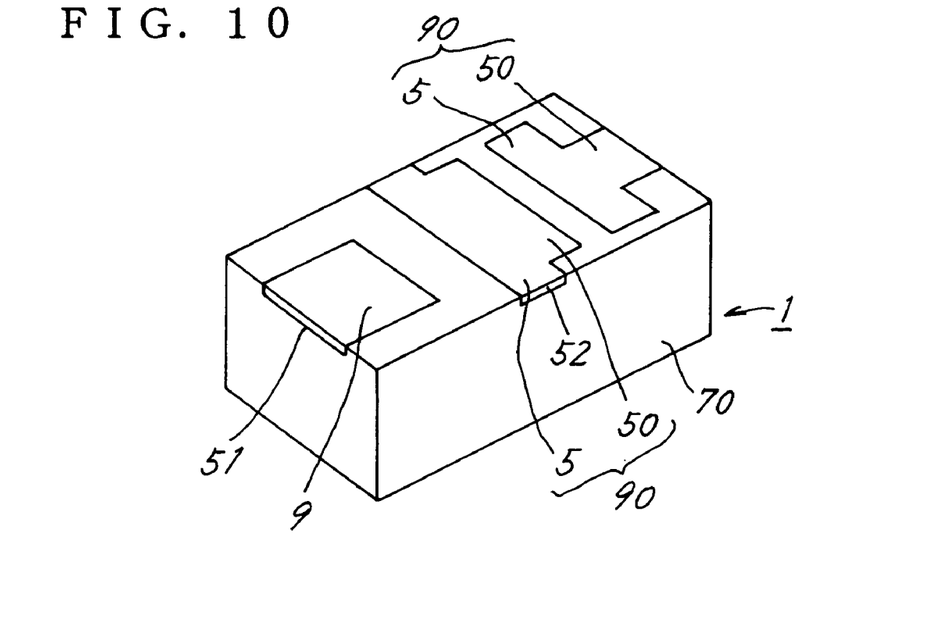
FIG. 10 is a perspective view of another solid electrolytic capacitor.

In this example, since the two connectors (85) and (85) are provided, the possibility that the relative position between the first terminal component (81) and the capacitor element (2) is displaced can be reduced. It should be noted that the number of the connectors (85) is not limited to two. It is not necessary to provide the second exposure portion (50) on the two terminals (9) and (90), and the second exposure portion (50) may be provided only on the one terminal (90) as shown in FIG. 10.

Figure 9:
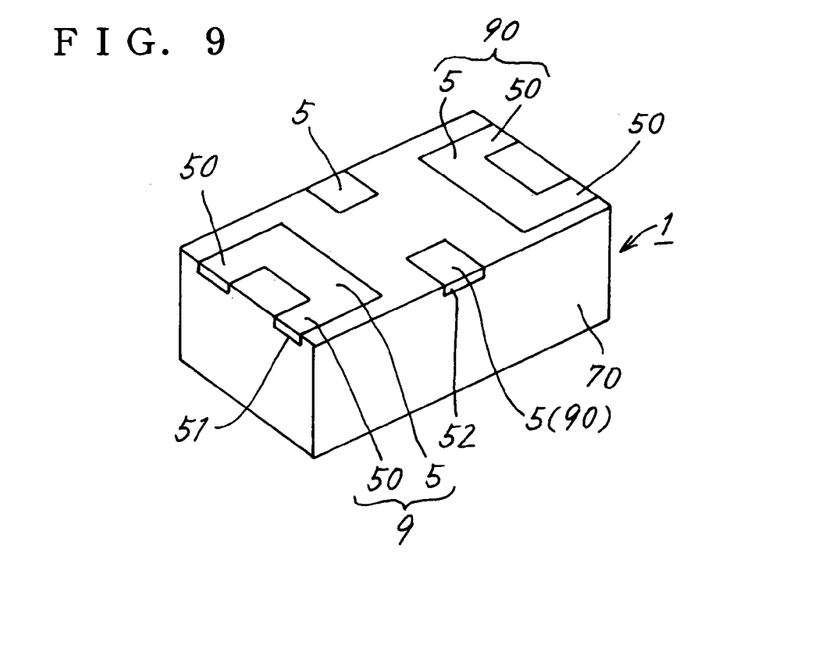
FIG. 9 is a perspective view of another solid electrolytic capacitor.

Furthermore, as shown in FIG. 9, three of the first exposure portions (5), (5), and (5) may be formed on the cathode terminal (90).

Third Embodiment

Figure 11:
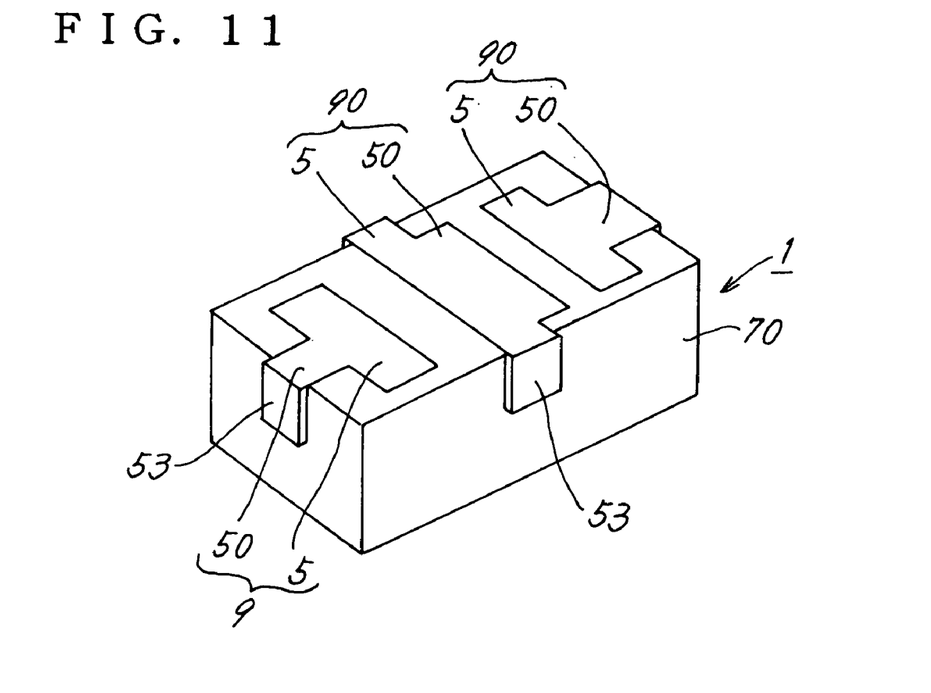
FIG. 11 is a perspective view of another solid electrolytic capacitor.

FIG. 11 is a perspective view showing another solid electrolytic capacitor (1). This example is characterized in that the front end portions of the first exposure portions (5) are bent upwards along the peripheral face of the housing (70) to form portions (53). In FIG. 11, although the front end portions of the first exposure portions (5) are bent downwards to form the portions (53), FIG. 11 shows the solid electrolytic capacitor (1) upside down, and thus the bent portions (53) of the first exposure portions (5) have the front ends facing upward in a state where the solid electrolytic capacitor (1) is used. Also, the front end portions of the second exposure portions (50) may be bent upwards to form portions (53).

In the bent portions (53), the back surfaces of the terminals (9) and (90) face outward. The back surfaces of the terminals (9) and (90) are soldered without fail, and thus in a state where the terminals (9) and (90) have been soldered, the solder is easily attached to the outer sides of the bent portions (53). Accordingly, it is possible to easily confirm whether or not the terminals (9) and (90) have been precisely soldered when viewed from the side. It should be noted that the above-described plating for improving the solder wettability may be or may not be performed.

What is claimed is:

1. A solid electrolytic capacitor, comprising:
a capacitor element,
an anode terminal and a cathode terminal that are attached to the capacitor element and that have an exposed bottom face, and
a housing that covers the capacitor element,
wherein at least one of the anode terminal and the cathode terminal is provided with a first exposure portion that has an exposed bottom face that extends substantially perpendicularly to an arrangement direction of the two terminals,
at least one first exposure portion has an end face exposed on a side face of the housing, the side face being substantially parallel to the arrangement direction of the two terminals and substantially perpendicular to said exposed bottom face,
the end face of the first exposure portion is apart from the end face of the housing which is substantially perpendicular to the arrangement direction of the two terminals,
wherein each first exposure portion is connected to a second exposure portion that extends along the arrangement direction of the two terminals,
the second exposure portion has a narrower width than the first exposure portion along a direction substantially perpendicular to an arrangement direction of the two terminals, and
at least one second exposure portion has an end face exposed on the end face of the housing.

2. The solid electrolytic capacitor according to claim 1, wherein at least one first exposure portion is provided on the cathode terminal.

3. A solid electrolytic capacitor, comprising:
a capacitor element,
an anode terminal and a cathode terminal that are attached to the capacitor element and that have an exposed bottom face, and
a housing that covers the capacitor element,
wherein at least one of the anode terminal and the cathode terminal is provided with a first exposure portion that has an exposed bottom face that extends substantially perpendicularly to an arrangement direction of the two terminals,
at least one first exposure portion has an end face exposed on a side face of the housing, the side face being substantially parallel to the arrangement direction of the two terminals and substantially perpendicular to said exposed bottom face,
the end face of the first exposure portion is apart from the end face of the housing which is substantially perpendicular to the arrangement direction of the two terminals,
wherein the two terminals are opposed to each other having an opening that is to be filled up with a resin configuring the housing,
a recess face is provided on the two terminals,
a peripheral face of the capacitor element is mounted on the recess face of the cathode terminal, and
end edges opposed to each other of the opening are positioned on inner sides of peripheral edges of the recess face,
an anode lead of the capacitor element is attached to the anode terminal at a portion out of the recess face.

4. The solid electrolytic capacitor according to claim 1, wherein each second exposure portion is provided on both sides of the first exposure portion, the end face of the second exposure portions is exposed on an end face of the housing, the end face of the housing being perpendicular to an arrangement direction of the two terminals.

5. A method for manufacturing a solid electrolytic capacitor, comprising:
a step of etching or half-blanking a metal plate to form a recess face,
a step of punching the metal plate to form a first terminal component and a second terminal component, which become opposite terminals, straddling the recess face,
a step of forming a recess portion on the second terminal component to allow portions other than the recess portion to serve as a first and a second exposure portion,
a step of forming, between the first terminal component and the second terminal component, an opening having end edges positioned on inner sides of peripheral edges of the recess face,
a step of mounting a capacitor element on the recess face, and
a step of covering the capacitor element by a resin block, filling up the opening and the recess portion with a resin, and cutting the resin block and the metal plate.

6. A solid electrolytic capacitor, comprising:

a capacitor element, an anode terminal and a cathode terminal that are attached to the capacitor element and that have an exposed bottom face, and a housing that covers the capacitor element, wherein the anode terminal or the cathode terminal is provided with an exposure portion having an end face exposed on a side face of the housing, the side face being substantially parallel to the arrangement direction of the two terminals, at least the end face on the exposure portion is plated for improving solder wettability, and wherein a plurality of portions of the bottom face of the cathode terminal are exposed on the housing, and the exposure portion having an exposed end face is provided closest to the anode terminal among the plurality of portions.

7. A solid electrolytic capacitor, comprising:

a capacitor element, an anode terminal and a cathode terminal that are attached to the capacitor element and that have an exposed bottom face, and a housing that covers the capacitor element, wherein the cathode terminal is provided with a plurality of exposure portions on the housing, a front end portion of an exposure portion is bent upwards along a peripheral face of the housing, and the exposure portion having a front end portion bent upwards is provided closest to the anode terminal among the plurality of portions.

8. A solid electrolytic capacitor, comprising:

a capacitor element, an anode terminal and a cathode terminal that are attached to the capacitor element and that have an exposed bottom face, and a housing that covers the capacitor element, wherein the cathode terminal is provided with a first exposure portion that has an exposed bottom face that extends substantially perpendicularly to an arrangement direction of the two terminals, at least one first exposure portion has an end face exposed on a side face of the housing, the side face being substantially parallel to the arrangement direction of the two terminals and perpendicular to said exposed bottom face, the end face of the first exposure portion is apart from the end face of the housing which is substantially perpendicular to an arrangement direction of the two terminals, the first exposure portion closest to the anode terminal has an end face exposed on a side face of the housing, the side face being substantially parallel to the arrangement direction of the two terminals, the end face of the first exposure portion is apart from the end face of the housing which is substantially perpendicular to an arrangement direction of the two terminals.

* * * * *